(12) United States Patent
Jang

(10) Patent No.: US 11,188,662 B2
(45) Date of Patent: Nov. 30, 2021

(54) ENCRYPTED DATA BACKUP AND RESTORATION FOR IMAGE FORMING APPARATUSES USING CLOUD

(71) Applicant: Hewlett-Packard Development Company, L.P., Spring, TX (US)

(72) Inventor: Young Dae Jang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/648,016

(22) PCT Filed: Jul. 6, 2018

(86) PCT No.: PCT/KR2018/007710
§ 371 (c)(1),
(2) Date: Mar. 17, 2020

(87) PCT Pub. No.: WO2019/098486
PCT Pub. Date: May 23, 2019

(65) Prior Publication Data
US 2020/0279048 A1 Sep. 3, 2020

(30) Foreign Application Priority Data
Nov. 20, 2017 (KR) .................. 10-2017-0154979

(51) Int. Cl.
| G06F 21/60 | (2013.01) |
| G06F 11/14 | (2006.01) |
| H04L 9/08  | (2006.01) |
| H04N 1/00  | (2006.01) |
| G06F 3/12  | (2006.01) |

(52) U.S. Cl.
CPC .......... *G06F 21/608* (2013.01); *G06F 3/1206* (2013.01); *G06F 3/1209* (2013.01);
(Continued)

(58) Field of Classification Search
None
See application file for complete search history.

(56) References Cited

U.S. PATENT DOCUMENTS

| 8,375,005 | B1* | 2/2013 | Claudatos ............... G06F 16/13 |
| | | | 707/654 |
| 10,922,132 | B1* | 2/2021 | Shiramshetti ......... H04L 9/0894 |

(Continued)

FOREIGN PATENT DOCUMENTS

| JP | 2017-016374 A | 1/2017 |
| JP | 2017-117284 A | 6/2017 |

(Continued)

*Primary Examiner* — Mohammad H Ghayour
*Assistant Examiner* — Pawan Dhingra
(74) *Attorney, Agent, or Firm* — Jefferson IP Law, LLP

(57) ABSTRACT

An apparatus and method for backing up data by using a cloud are provided. According to an example, the method may include receiving a data backup request from a first image forming apparatus, receiving a backup data list generated by using a first security key, the first security key generated to encrypt data and identification information of the first image forming apparatus, receiving, from the first image forming apparatus, backup data encrypted by using the first security key, receiving, from a second image forming apparatus, a second security key corresponding to a data restoration request, and, when the second security key received from the second image forming apparatus is the same as the first security key generated to encrypt the data, transmitting the backup data list to the second image forming apparatus.

17 Claims, 9 Drawing Sheets

(52) U.S. Cl.
CPC ...... *G06F 11/1451* (2013.01); *G06F 11/1464* (2013.01); *G06F 11/1469* (2013.01); *H04L 9/0866* (2013.01); *H04N 1/00244* (2013.01); *G06F 3/1288* (2013.01); *G06F 2201/84* (2013.01)

(56) References Cited

U.S. PATENT DOCUMENTS

| | | | | |
|---|---|---|---|---|
| 2004/0257614 | A1* | 12/2004 | Tanimoto | H04N 1/33376 358/1.15 |
| 2008/0158581 | A1* | 7/2008 | Ferlitsch | G06F 3/1247 358/1.13 |
| 2008/0256315 | A1* | 10/2008 | Awai | G06F 11/1448 711/162 |
| 2010/0169753 | A1* | 7/2010 | Chen | G11B 27/034 715/201 |
| 2013/0057903 | A1* | 3/2013 | Yamazaki | G06F 21/608 358/1.15 |
| 2013/0101113 | A1* | 4/2013 | Cannon | G06F 21/6209 380/44 |
| 2013/0208303 | A1* | 8/2013 | Uchida | G06F 3/0482 358/1.15 |

FOREIGN PATENT DOCUMENTS

| | | |
|---|---|---|
| KR | 10-0709357 B1 | 4/2007 |
| KR | 10-2007-0059699 A | 6/2007 |
| KR | 10-1447191 B1 | 10/2014 |

* cited by examiner

[Fig. 1]
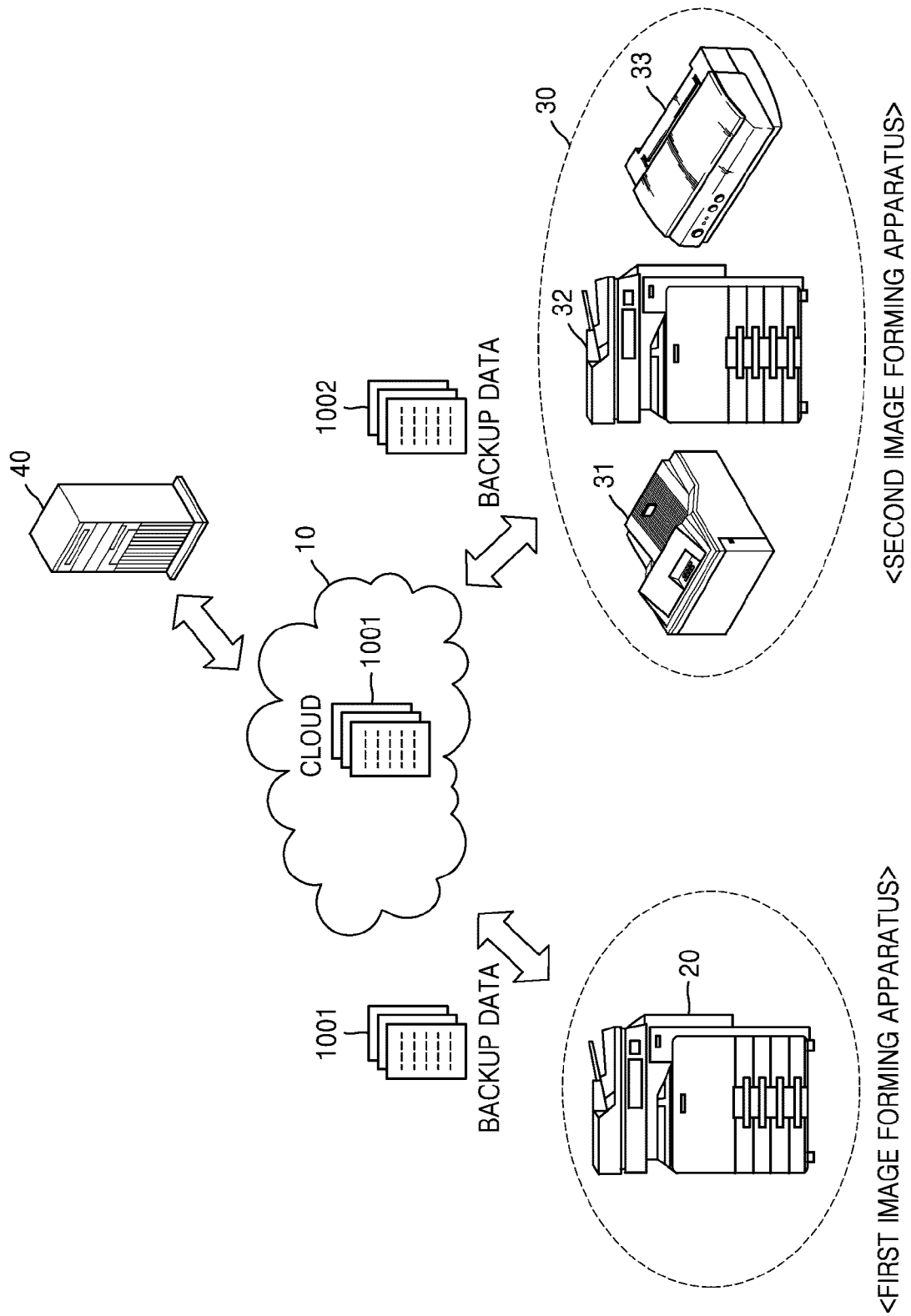

[Fig. 2]
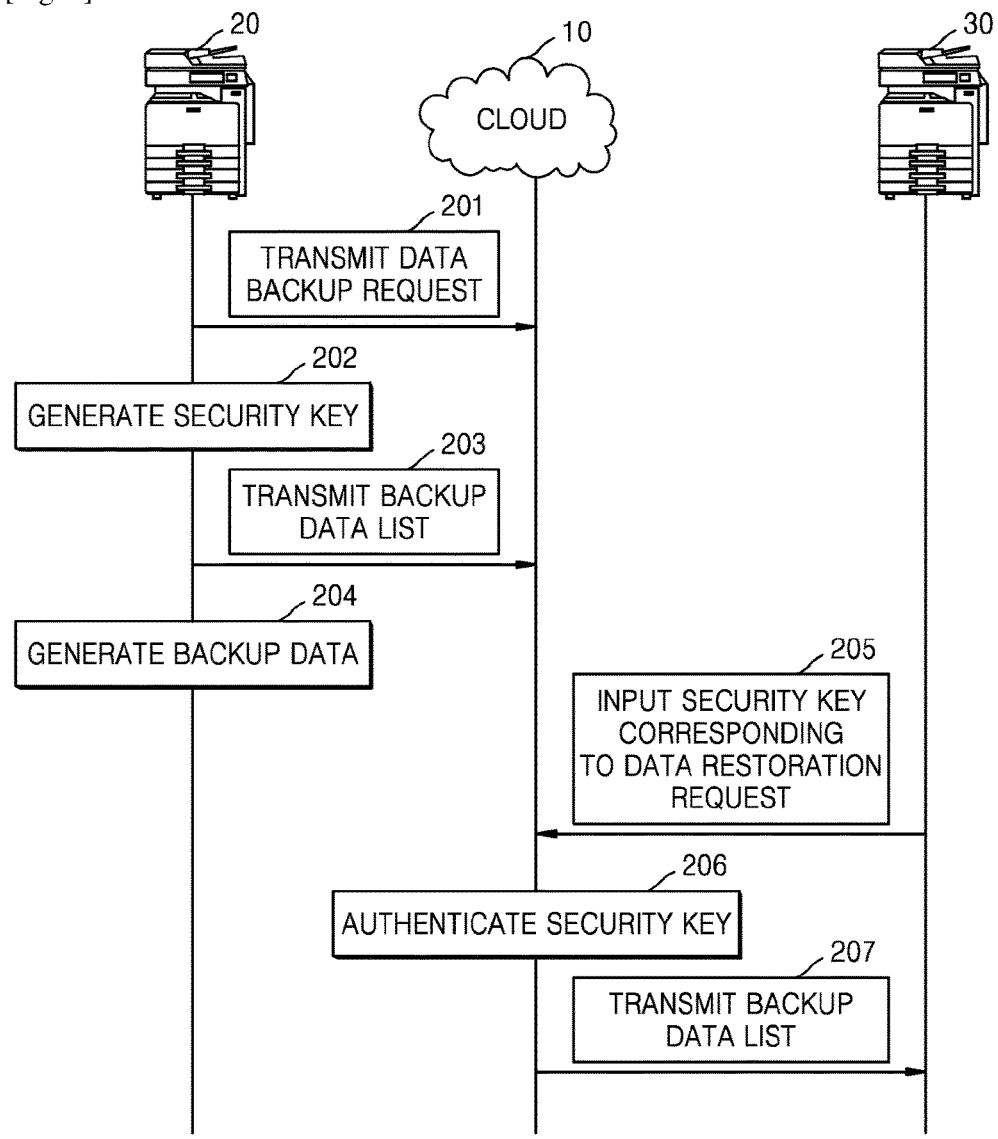
[Fig. 3]
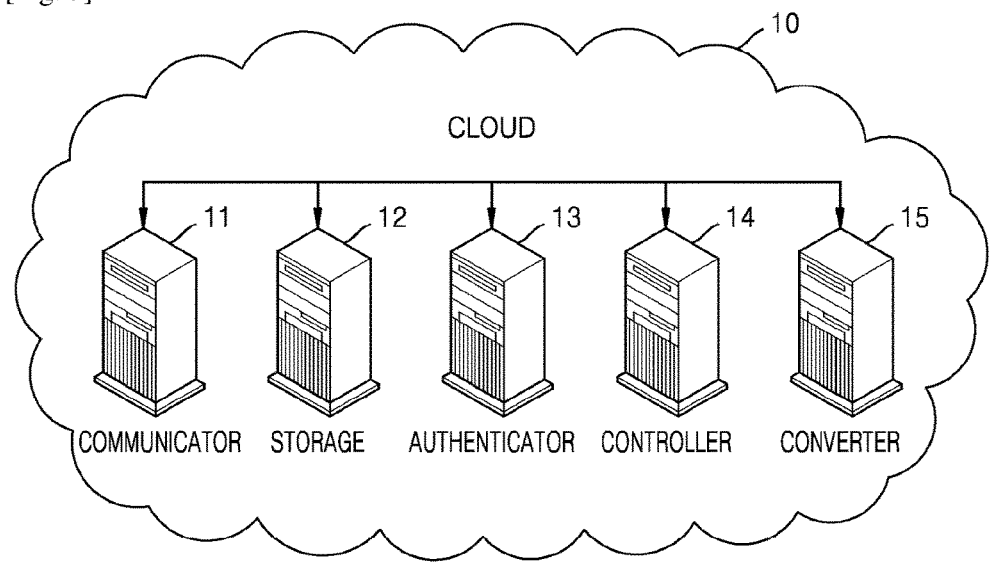

[Fig. 4]
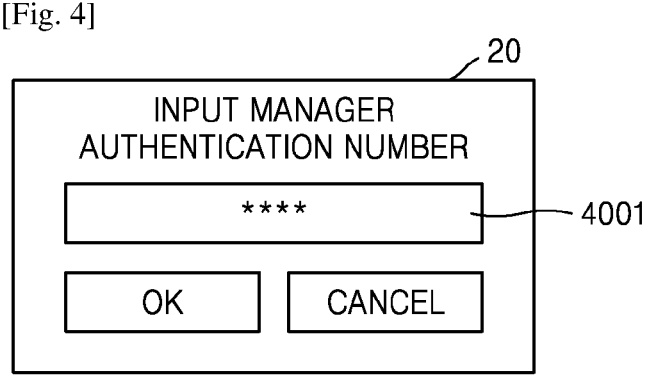
[Fig. 5]
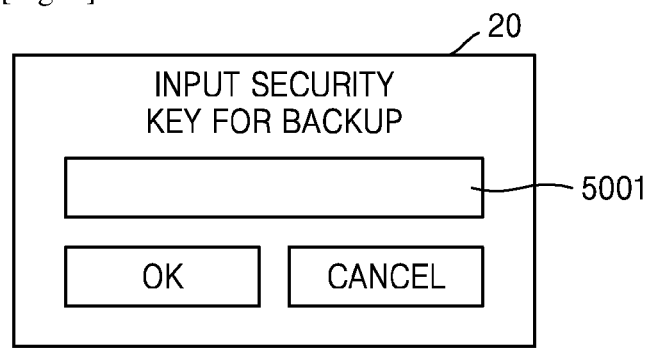

[Fig. 6]

| 601 Data Type | 602 Data Name | 603 Data Path | 604 Owner | 605 Date | 606 Version | 607 Usage Count |
|---|---|---|---|---|---|---|
| System Data | Config.dat | System/Config/ | John | 2010-01-05 | | |
| Application Data | Image_viewer | App/ | All | 2013-03-05 | 1.3.0 | |
| Document Data | ISO_Test(E).pdf | Document/ | Jane | 2011-04-02 | | 150 |
| Document Data | Sample.jpg | Document/ | Jane | 2015-11-01 | | 10 |

[Fig. 7]
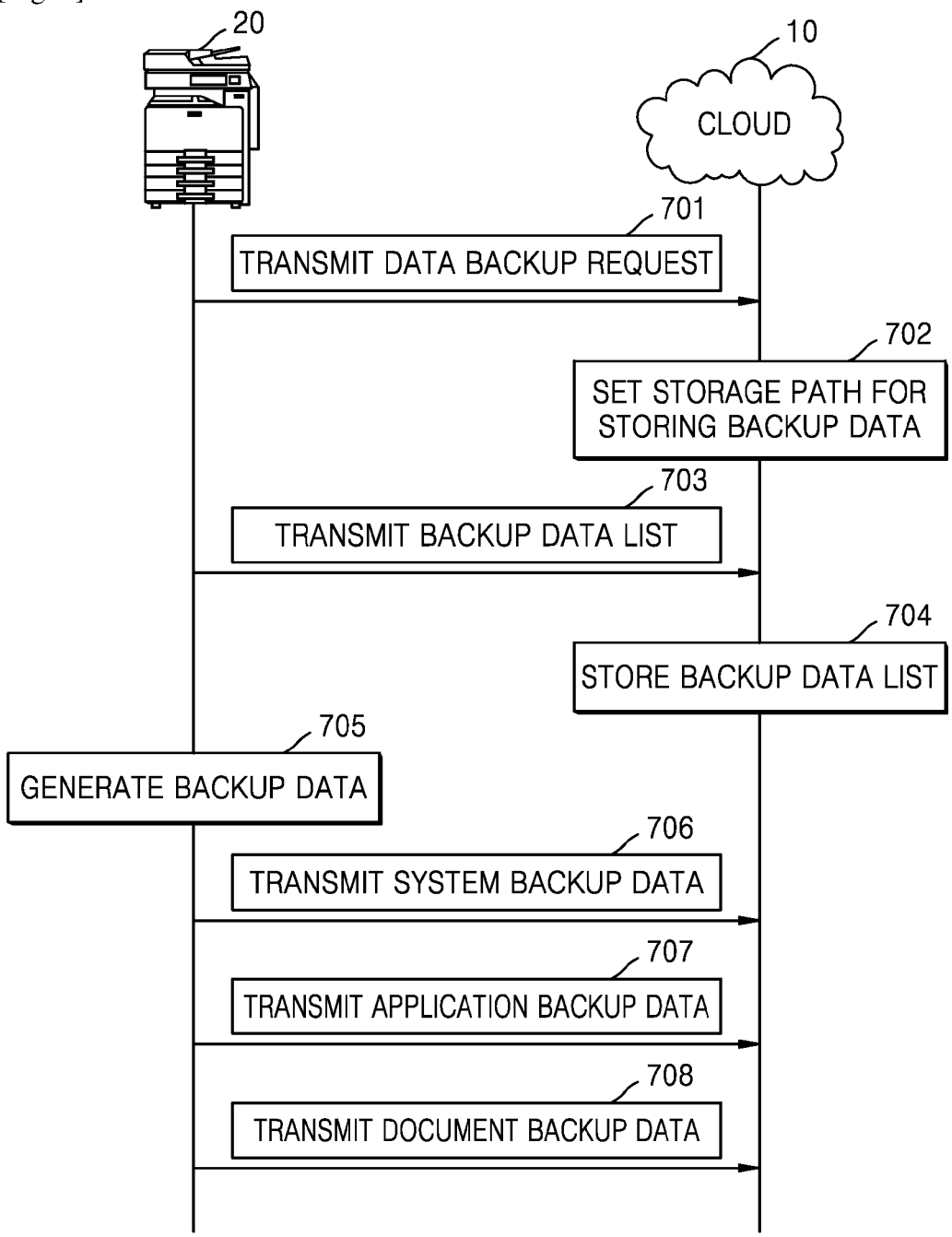

[Fig. 8]
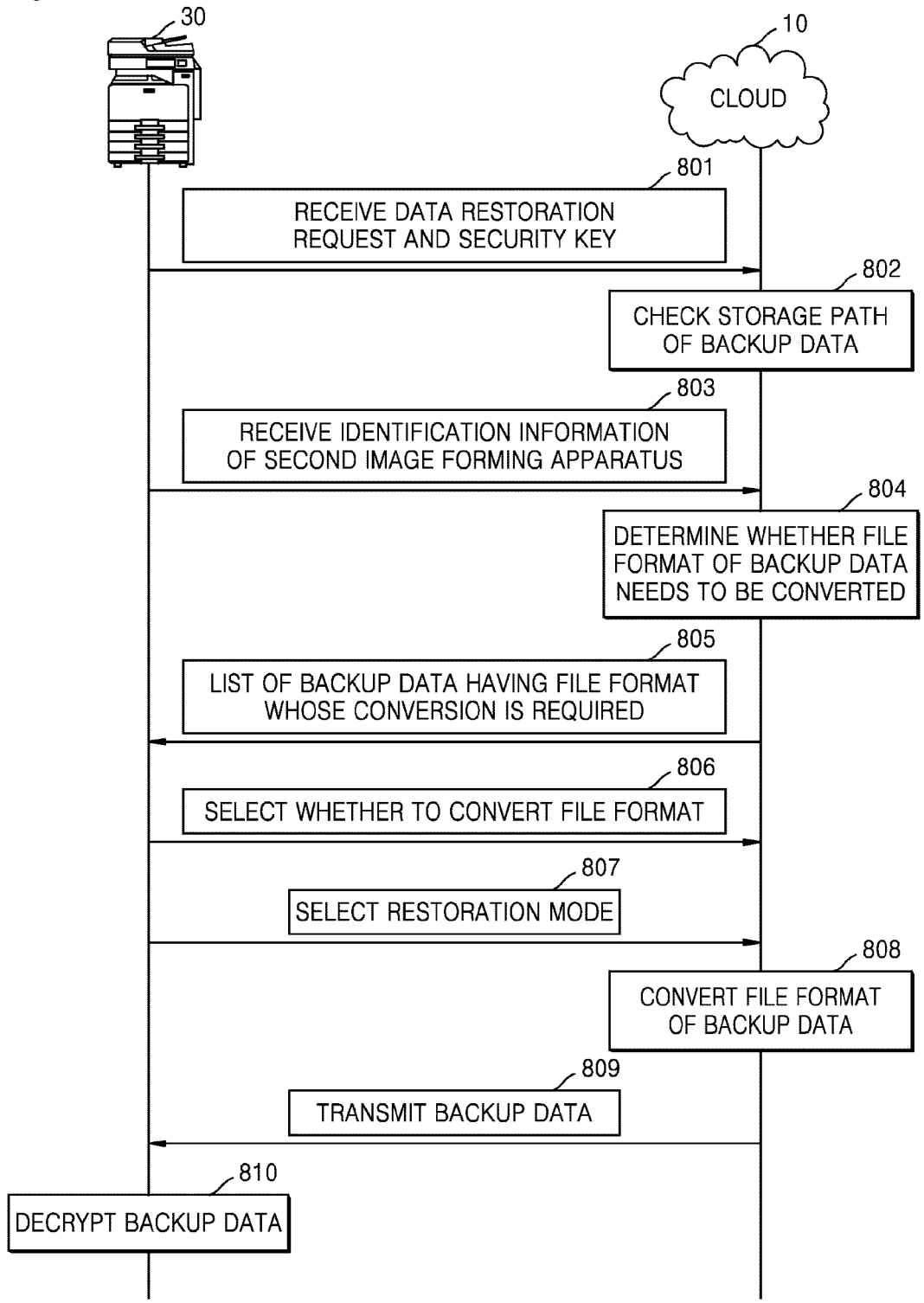

[Fig. 9]
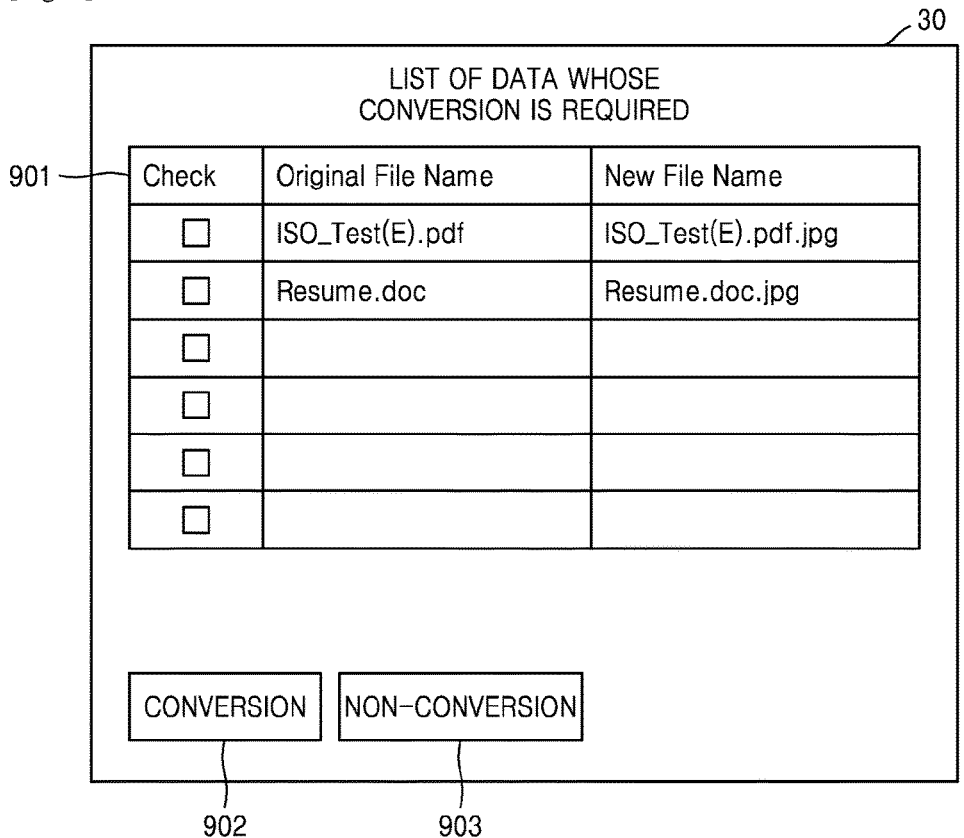
[Fig. 10]
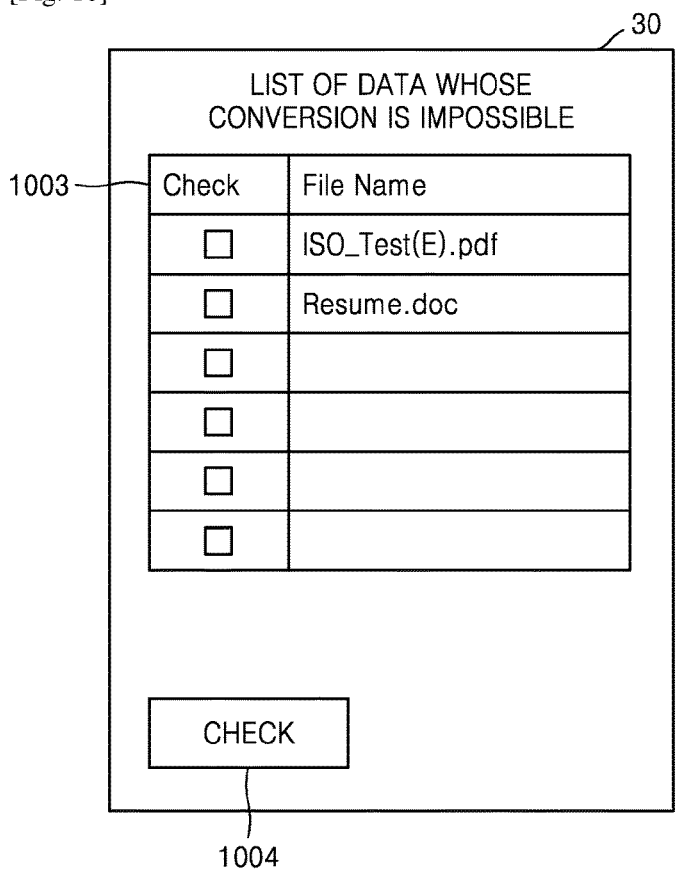

[Fig. 11]
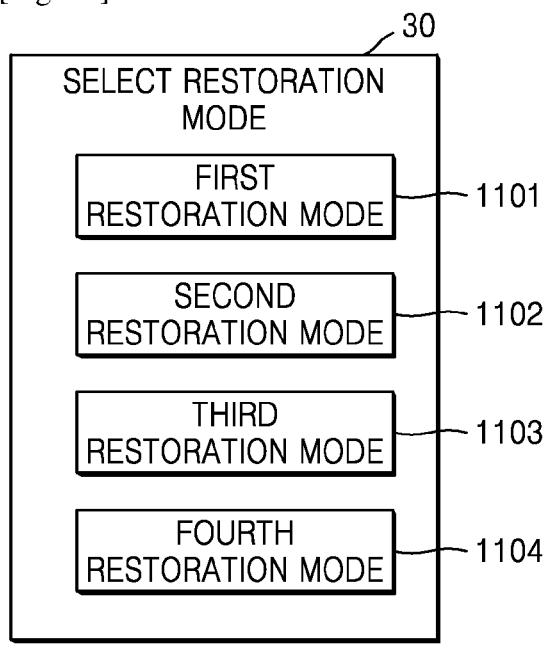

[Fig. 12]
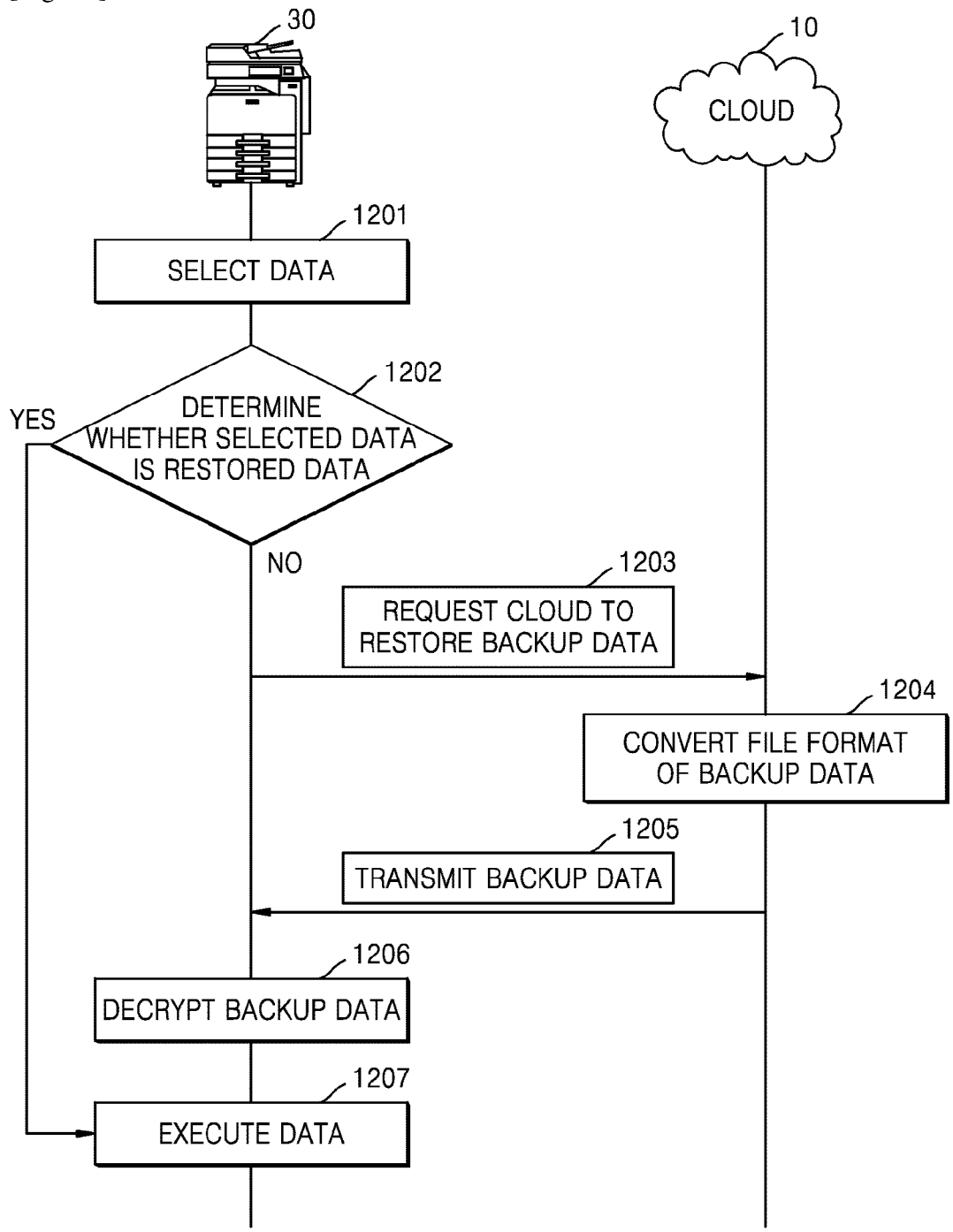

ENCRYPTED DATA BACKUP AND RESTORATION FOR IMAGE FORMING APPARATUSES USING CLOUD

BACKGROUND ART

While using an electronic device such as a multi-function printer, a user may install an application that provides a desired function. However, if the electronic device is an existing electronic device, it may break down and a new electronic device may be purchased. Thus, the existing electronic device may be replaced with the new electronic device. In this case, when data stored in the existing electronic device is backed up and then restored in the new electronic device, user convenience may be improved. To meet such demand, a function of backing up a system file used in the existing electronic device and restoring the system file in the new electronic device is provided.

However, in order to backup and transmit all data from the existing electronic device to the new electronic device, an external storage device or an external personal computer (PC) is required, and when a file format needs to be converted, file conversion has to be performed after restoration.

BRIEF DESCRIPTION OF DRAWINGS

The above and other aspects, features, and advantages of certain examples of the present disclosure will be more apparent from the following description taken in conjunction with the accompanying drawings, in which:

FIG. 1 is a diagram for explaining an operation of backing up data of an image forming apparatus by using a cloud, according to an example;

FIG. 2 is a flowchart of an operation of backing up data of a first image forming apparatus by using a cloud and transmitting a backup data list to a second image forming apparatus, according to an example;

FIG. 3 is a diagram illustrating a configuration of a cloud, according to an example;

FIG. 4 is a diagram of a user interface of an image forming apparatus for receiving a manager authentication number, according to an example;

FIG. 5 is a diagram of a user interface of an image forming apparatus for receiving a security key, according to an example;

FIG. 6 is a diagram of a backup data list, according to an example;

FIG. 7 is a flowchart of a method by which a first image forming apparatus transmits backup data to a cloud, according to an example;

FIG. 8 is a flowchart of a method of restoring data between a second image forming apparatus and a cloud, according to an example;

FIG. 9 is a diagram of a second image forming apparatus that displays a list of data whose conversion is required, according to an example;

FIG. 10 is a diagram of a second image forming apparatus that displays a list of data whose conversion is impossible, according to an example;

FIG. 11 is a diagram of a user interface through which a second image forming apparatus selects a provided restoration mode, according to an example; and FIG. 12 is a flowchart of an operation between a second image forming apparatus and a cloud for data execution, according to an example.

Throughout the drawings, it should be noted that like reference numbers are used to depict the same or similar elements, features, and structures.

MODE FOR THE INVENTION

An "image forming apparatus" may denote any apparatus capable of performing an image forming job, such as a printer, a scanner, a copier, a fax machine, a multi-function printer (MFP), and a display apparatus. Also, "print data" may denote data having a format printable by a printer, and a "scan file" may denote a file generated by scanning an image by using a scanner.

Various examples will now be described more fully with reference to the accompanying drawings. The examples described herein may be modified in many different forms and should not be construed as being limited to examples set forth herein. To more clearly describe features of examples, matters well known to one of ordinary skill in the art to which the below examples pertain will not be described in detail.

FIG. 1 is a diagram for explaining an operation of backing up data of an image forming apparatus by using a cloud, according to an example.

Referring to FIG. 1, a first image forming apparatus 20 may generate backup data 1001 that may be decrypted by using a security key. The first image forming apparatus 20 may transmit the backup data 1001 to a cloud 10.

According to an example, the cloud 10 may receive the backup data 1001 from the first image forming apparatus 20 and may store the received backup data 1001. The cloud 10 may receive information about an application file from an application server 40.

According to an example, the application server 40 may include information about a version of an application used in an image forming apparatus. The application server 40 may provide a file required for backup and restoration of the image forming apparatus and may provide a file for checking compatibility of the application by comparing identification information of the first image forming apparatus 20 and a second image forming apparatus 30. The application server 40 may communicate with the cloud 10 via a network (not shown).

The second image forming apparatus 30 may include a plurality of image forming apparatuses 31, 32, and 33. The plurality of image forming apparatuses 31, 32, and 33 may include different systems, applications, and system files. The second image forming apparatus 30 may receive backup data 1002 from the cloud 10.

FIG. 2 is a flowchart of an operation of backing up data of a first image forming apparatus by using a cloud and transmitting a backup data list to a second image forming apparatus, according to an example.

Referring to FIG. 2, the first image forming apparatus 20 may transmit a data backup request to the cloud 10 in operation 201. According to the data backup request of the first image forming apparatus 20, the cloud 10 may set a storage location for storing backup data.

In operation 202, according to an example, the first image forming apparatus 20 may generate a security key. According to an example, the first image forming apparatus 20 may generate the security key by using a security number received from a user. Additionally or alternatively, the first image forming apparatus 20 may generate the security key by using user information and information of the first image forming apparatus 20, may generate the security key by using security information received from the cloud 10, may generate the security key by using user biometric information, or may generate the security key by using user authentication information using an external device.

In operation 203, according to an example, the first image forming apparatus 20 may transmit a backup data list to the cloud 10. The first image forming apparatus 20 may generate the backup data list including information of all data of the first image forming apparatus 20.

In operation 204, according to an example, the first image forming apparatus 20 may generate backup data. The first image forming apparatus 20 may generate the backup data by encrypting all data included in the backup data list, and may generate the backup data by encrypting the data using the generated security key. The first image forming apparatus 20 may generate the backup data by decrypting data by using the security key.

In operation 205, according to an example, the second image forming apparatus 30 may transmit a data restoration request to the cloud 10. The second image forming apparatus 30 may input a security key while transmitting the data restoration request. The security key may correspond to data to be restored.

In operation 206, according to an example, the cloud 10 may authenticate the security key received from the second image forming apparatus 30. According to an example, the cloud 10 may determine whether the security key input by the second image forming apparatus 30 is the same as the security key generated by the first image forming apparatus 20. According to an example, the cloud 10 may determine whether the security key input by the second image forming apparatus 30 is the same as the security key corresponding to the backup data.

In operation 207, according to an example, if the security key is authenticated, the cloud 10 may transmit the backup data list to the second image forming apparatus 30.

FIG. 3 is a diagram illustrating a configuration of a cloud, according to an example.

Referring to FIG. 3, the cloud 10 may include a communicator 11, a storage 12, an authenticator 13, a controller 14, and a converter 15. However, the cloud 10 may additionally include elements (not shown) other than the above elements illustrated in FIG. 3 or may include fewer elements than the above elements illustrated in FIG. 3.

The cloud 10 may be implemented in various ways. For example, when at least one of the communicator 11, the storage 12, the authenticator 13, the controller 14, and the converter 15 corresponds to a physically separate server device, the cloud 10 may be implemented by establishing a framework that virtualizes independent server devices into one server device and logically connects the devices. Alternatively, the cloud 10 may be implemented as one server device, and the communicator 11, the storage 12, the authenticator 13, the controller 14, and the converter 15 may be provided as software modules or hardware modules in the one server device. That is, the cloud 10 is not limited to one implementation type.

The communicator 11 may be implemented as, but is not limited to, a server that functions as a gateway allowing a device existing outside the cloud 10 to connect to the cloud 10, for example, an open application programming interface (API) module such as a representational state transfer API (REST API) module or a RESTful API module.

The communicator 11 may be a standardized protocol server for transmitting a message among different devices (e.g., the first image forming apparatus 20, the second image forming apparatus 30, and the application server 40) via the cloud 10. For example, the communicator 11 may be implemented as an open protocol-based server such as an extensible messaging and presence protocol (XMPP) server. However, examples of the present disclosure are not limited thereto, and the communicator 11 may be implemented as a server using other protocols.

The storage 12 may include any of various types of memories and may store a variety of information processed in the cloud 10. The storage 12 may store a backup data list and backup data received from the first image forming apparatus.

The authenticator 13 may authenticate information that needs to be authenticated, such as information of an image forming apparatus communicating with the cloud 10, user information, and an encryption key. The authenticator 13 may perform authentication by comparing information that is previously stored in the storage 12 with newly obtained information. The authenticator 13 may verify the validity of a version of an application, a file, an update file, and an installation file.

The controller 14 controls functions and operations of the communicator 11, the storage 12, the authenticator 13, the controller 14, and the converter 15 in the cloud 10. The controller 14, which may include a processor, such as a central processing unit (CPU), may process information about an information request, backup data list transmission and request information, and backup data transmission and request information received from the first image forming apparatus 20 and the second image forming apparatus 30.

The converter 15 may convert a file format of backup data. For example, when a file format of backup data transmitted by the first image forming apparatus 20 is not a file format executable by the second image forming apparatus 30, the converter 15 may convert the file format of the backup data.

The cloud 10 may be implemented as infrastructure as a service (IaaS) such as Amazon elastic compute cloud (EC2) or Amazon simple storage service (Amazon S3) provided by Amazon Web Services (AWS). Alternatively, the cloud 10 may be implemented to have a cloud architecture that is independently established for business to business (B2B), without depending on an IaaS provider or a platform as a service (PaaS) provider. That is, the cloud 10 is not limited to one architecture type.

FIG. 4 is a diagram of a user interface of an image forming apparatus for receiving a manager authentication number, according to an example.

Referring to FIG. 4, an example is shown in which a manager mode is executed in order for the first image forming apparatus 20 to transmit a data backup request. The first image forming apparatus 20 may request a user for a manager authentication number required to execute the manager mode. According to an example, the user may input the manager authentication number to a user interface 4001 provided by the first image forming apparatus 20.

According to an example, the manager authentication number may be generated by using user identification information and identification information of the first image forming apparatus 20. According to an example, the manager authentication number may be a unique identification number generated by the first image forming apparatus 20.

According to an example, the first image forming apparatus 20 may provide a user interface for data backup, according to an authentication result of the manager authentication number.

FIG. 5 is a diagram of a user interface of an image forming apparatus for receiving a security key, according to an example.

Referring to FIG. 5, an example is shown in which the first image forming apparatus 20 may request a security key in order to execute a backup.

The first image forming apparatus 20 may generate the security key by using at least one from among a security identification value received from a user, a security identification value generated by a cloud, identification information of the first image forming apparatus 20, and user identification information. The first image forming apparatus 20 may provide the generated security key to the user.

According to an example, the user may request data backup of the first image forming apparatus 20 by inputting the security key to a user interface 5001 provided by the first image forming apparatus 20.

According to an example, when the security key input by the user is valid, the first image forming apparatus 20 may request the cloud 10 for data backup.

FIG. 6 is a diagram of a backup data list, according to an example.

Referring to FIG. 6, the first image forming apparatus 20 may generate a backup data list by using a security key generated to encrypt data and identification information of the first image forming apparatus 20. That is, the first image forming apparatus 20 may generate the backup data list encrypted by using a unique security key and unique device information. According to an example, the backup data list may correspond to the unique device information of the first image forming apparatus 20. Also, according to an example, the first image forming apparatus 20 may transmit the encrypted backup data list to the cloud 10. The cloud 10 may find the backup data list by using the identification information of the first image forming apparatus 20. Also, the cloud 10 may use the security key in order to browse the backup data list.

According to an example, the first image forming apparatus 20 may generate the entire data list according to a data backup request of a user. According to an example, the first image forming apparatus 20 may generate the backup data list by determining pieces of data needing to be backed up.

According to an example, the first image forming apparatus 20 may generate the backup data list before data is decrypted.

According to an example, the backup data list may include a data type 601, a data name 602, a data path 603, an owner 604, a date 605, a version 606, and a usage count 607.

The data type 601 may include system data related to a system of the first image forming apparatus 20, application data related to an application included in the first image forming apparatus 20, document data related to a job of the first image forming apparatus 20, or the like.

The data name 602 for identifying data may include information about a file format of a data file.

The data path 603 is information for identifying a location where data is stored in the first image forming apparatus 20.

The owner 604 may include information about a person who generates or uses data.

The owner 604 may include information about a person who most recently uses data, information about a person such as a user associated with the image forming apparatus 20, or the like.

The date 605 refers to a most recent date when data is used.

The version 606 refers to a current version of data. When data is the application data, the version 606 may also display whether the data is updated.

FIG. 7 is a flowchart of a method by which a first image forming apparatus transmits backup data to a cloud, according to an example.

Referring to FIG. 7, the first image forming apparatus 20 may transmit a data backup request to the cloud 10 in operation 701.

According to an example, in operation 702, the cloud 10 receiving the data backup request from the first image forming apparatus 20 may set a storage path for storing backup data in the cloud 10. As an example, the cloud 10 may allocate a storage space for the backup data.

According to an example, in operation 703, the image forming apparatus 20 may transmit a backup data list to the cloud 10. The backup data list is a list of pieces of data needing to be backed up.

According to an example, in operation 704, the cloud 10 may store the backup data list.

According to an example, in operation 705, the first image forming apparatus 20 may encrypt data included in the backup data list. According to an example, the first image forming apparatus 20 may decrypt the data by using a security key. The first image forming apparatus 20 may generate the backup data by sequentially encrypting system data, application data, and document data. However, an order in which the backup data is generated in an encryption process may be changed.

According to an example, in operation 706, the first image forming apparatus 20 may transmit system backup data to the cloud 10.

According to an example, in operation 707, the first image forming apparatus 20 may transmit application backup data to the cloud 10.

According to an example, in operation 708, the first image forming apparatus 20 may transmit document backup data to the cloud 10.

An order in which the backup data is transmitted in operations 706 through 708 may be changed. According to an example, in order to support a fast restoration service, it is preferable that data is transmitted in an order of the system backup data, the backup data, and the document backup data.

FIG. 8 is a flowchart of a method of restoring data between a second image forming apparatus and a cloud, according to an example.

Referring to FIG. 8, the cloud 10 may receive a data restoration request and a security key from the second image forming apparatus 30 in operation 801. A user may input the security key through a user interface of the second image forming apparatus 30.

According to an example, in operation 802, the cloud 10 may check a storage path of backup data according to the data restoration request of the second image forming apparatus 30. According to an example, the cloud 10 may check an identification number of the backup data requested to be restored, and may determine a location where the backup data is stored.

According to an example, in operation 803, the cloud 10 may receive identification information of the second image forming apparatus 30 from the second image forming apparatus 30. The identification information of the second image forming apparatus 30 may include a serial number, version information, system data information, application information of the second image forming apparatus 30, or the like.

According to an example, in operation 804, the cloud 10 may determine whether a file format of the backup data needs to be converted. According to an example, the cloud 10 may determine whether the backup data is restorable by using the identification information of the second image forming apparatus 30. For example, when the file format of the backup data is not a file format executable by the second image forming apparatus 30, the cloud 10 may determine that the file format needs to be converted.

Also, the cloud 10 may determine a file having a file format whose conversion is required but is impossible.

According to an example, in operation 805, the cloud 10 may transmit a list of backup data having a file format whose conversion is required to the second image forming apparatus 30. According to an example, the list of the backup data having the file format whose conversion is required may include backup data having a file format whose conversion is not required, backup data having a file format whose conversion is required, and backup data having a file format whose conversion is required but is impossible.

According to an example, in operation 806, the cloud 10 may request the second image forming apparatus 30 to select whether to convert the file format. For example, when the cloud 10 notifies that file formats of five files out of ten files need to be converted and the second image forming apparatus 30 selects the five files needing to be converted, the cloud 10 may convert the file formats of the five files into file formats executable by the second image forming apparatus 30.

According to an example, in operation 807, the cloud 10 may request the second image forming apparatus 30 to select a restoration mode.

According to an example, the restoration mode is a mode in which the second image forming apparatus 30 determines how much of the backup data is to be restored.

According to an example, in operation 808, the cloud 10 may determine backup data to be transmitted based on the restoration mode selected by the second image forming apparatus 30, and may convert a file format of backup data whose conversion is required from among the determined backup data. The cloud 10 may convert the file format based on whether to convert the file format selected by the user in operation 806.

According to an example, in operation 809, the cloud 10 may transmit the backup data to the second image forming apparatus 30.

According to an example, in operation 810, the second image forming apparatus 30 may decrypt the backup data received from the cloud 10. The second image forming apparatus 30 may decrypt the backup data by using the security key.

FIG. 9 is a diagram of a second image forming apparatus that displays a list of data whose conversion is required, according to an example.

Referring to FIG. 9, the second image forming apparatus 30 may receive a list of backup data whose conversion is required from among backup data from the cloud 10. The second image forming apparatus 30 may display the list of the backup data whose conversion is required including an original file name and a new file name after conversion. For example, when a pdf file is to be converted into a jpg file, the second image forming apparatus 30 may display both the original file name and the new file name after conversion.

The second image forming apparatus 30 may receive a file to be converted from a user. When the user selects the file to be converted in a checklist 901, file conversion may be performed only on the checked file(s).

According to an example, when the user selects the file to be converted and presses a conversion button 902, the second image forming apparatus 30 may request the cloud 10 to convert the selected file.

According to an example, when the user selects a non-conversion button 903, the second image forming apparatus 30 may notify the cloud 10 that the file is not to be converted.

FIG. 10 is a diagram of a second image forming apparatus that displays a list of data whose conversion is impossible, according to an example.

Referring to FIG. 10, the second image forming apparatus 30 may receive a list of backup data having a file format whose conversion is required but is impossible from the cloud 10.

According to an example, the second image forming apparatus 30 may provide a user interface through which a checklist 1003 is displayed along with a file name. A user may check data whose conversion is impossible, may select a file in the checklist 1003, and may select a check button 1004. When the user selects the check button 1004, the second image forming apparatus 30 may transmit a selection result to the cloud 10.

FIG. 11 is a diagram of a user interface through which a second image forming apparatus selects a provided restoration mode, according to an example.

Referring to FIG. 11, the second image forming apparatus 30 may receive at least one backup data from the cloud 10, if necessary.

A first restoration mode 1101 is a mode in which all backup data included in a backup data list is restored. According to an example, when the second image forming apparatus 30 selects the first restoration mode 1101, the cloud 10 may transmit all stored backup data to the second image forming apparatus 30.

A second restoration mode 1102 is a mode in which backup data used a predetermined number of times or more in the backup data list is restored. According to an example, when the second image forming apparatus 30 selects the second restoration mode 1102, the cloud 10 may determine the backup data used the predetermined number of times or more and may transmit the determined backup data to the second image forming apparatus 30. In this case, the predetermined number of times may be set by the second image forming apparatus 30.

A third restoration mode 1103 is a mode in which backup data used within a predetermined period in the backup data list is restored. According to an example, when the second image forming apparatus 30 selects the third restoration mode 1103, the cloud 10 may determine the backup data used within the predetermined period and may transmit the determined backup data to the second image forming apparatus 30. In this case, the predetermined period may be set by the second image forming apparatus 30.

A fourth restoration mode 1104 is a mode in which backup data included in the backup data list is not restored and only data required at a current use time is received from the cloud 10. According to an example, when the second image forming apparatus 30 selects the fourth restoration mode 1104, the cloud 10 may determine data currently required by the second image forming apparatus 30 and may transmit the determined data. Since the fourth restoration mode 1104 is a mode in which data is received from the cloud 10 without being stored in the second image forming apparatus 30, a memory of the second image forming apparatus 30 may be more efficiently used.

FIG. 12 is a flowchart of an operation between a second image forming apparatus and a cloud for data execution, according to an example.

Referring to FIG. 12, the second image forming apparatus 30 may select data for executing a function in operation 1201.

According to an example, in operation 1202, the second image forming apparatus 30 may determine whether the selected data is restored data. According to an example, the second image forming apparatus 30 may determine whether the data for executing the function is stored in the second image forming apparatus 30.

According to an example, when the second image forming apparatus 30 determines that the data is restored data, the operation proceeds to operation 1207. In operation 1207, the data stored in the second image forming apparatus 30 may be executed.

According to an example, when the second image forming apparatus 30 determines that the data is not restored data, the operation proceeds to operation 1203. In operation 1203, the second image forming apparatus 30 may request the cloud 10 to restore backup data.

According to an example, in operation 1204, the cloud 10 may convert a file format of the backup data, if necessary.

According to an example, in operation 1205, the cloud 10 may transmit the backup data to the second image forming apparatus 30.

According to an example, the second image forming apparatus 30 may decrypt the backup data in operation 1206, and may execute the decrypted backup data in operation 1207.

While the present disclosure has been shown and described with reference to examples thereof, it will be understood by one of ordinary skill in the art that various changes in form and details may be made therein without departing from the spirit and scope of the present disclosure as defined by the following claims. Hence, it will be understood that the examples described above are not limiting of the scope of the present disclosure. For example, each component described in a single type may be executed in a distributed manner, and components described distributed may also be executed in an integrated form.

The above-described methods can be written as computer programs and can be implemented in general-use digital computers that execute the programs using a computer readable recording medium. Examples of the computer-readable recording medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and any device capable of storing an instruction or software, related data, a data file, and data structures and providing the instruction or software, the related data, the data file, and the data structures to a processor or a computer such that the processor or the computer execute the instruction.

The scope of the present disclosure is not defined by the detailed description of the disclosure but by the claims, and all modifications or alternatives derived from the scope and spirit of the claims and equivalents thereof fall within the scope of the present disclosure.

The invention claimed is:

1. A method comprising:
    receiving, by a server, a data backup request from a first image forming apparatus;
    receiving, by the server, a backup data list generated by using a first security key to encrypt data and identification information of the first image forming apparatus, the backup data list including a list of files of the first image forming apparatus;
    receiving, by the server from the first image forming apparatus, backup data, the backup data including a first file and a second file from the list of files, wherein the first file is a separate file from the second file and the first file and the second file are each encrypted by using the first security key;
    receiving, by the server from a second image forming apparatus, a second security key corresponding to a data restoration request;
    determining, by the server, whether a file format of the backup data needs to be converted for execution by the second image forming apparatus; and
    when the second security key received from the second image forming apparatus is the same as the first security key, transmitting, by the server, the backup data list including a list of files that need conversion based on the file format to the second image forming apparatus.

2. The method of claim 1, wherein the first security key is generated by the first image forming apparatus by using a security identification value received from a user, a security identification value generated by a cloud, the identification information of the first image forming apparatus, or user identification information.

3. The method of claim 1, wherein the receiving, by the server, of the backup data comprises determining a priority order of system backup data, application backup data, and print backup data, according to a preset criterion, and receiving the backup data according to the priority order.

4. The method of claim 1, further comprising:
    requesting, by the server, the second image forming apparatus to select a restoration mode for determining whether to restore a whole or a part of the backup data list; and
    transmitting, by the server, backup data to the second image forming apparatus according to the restoration mode selected by the second image forming apparatus.

5. The method of claim 4, wherein the restoration mode comprises:
    a first restoration mode in which all backup data included in the backup data list is restored;
    a second restoration mode in which backup data used a predetermined number of times or more in the backup data list is restored;
    a third restoration mode in which backup data used within a predetermined period in the backup data list is restored; or
    a fourth restoration mode in which backup data included in the backup data list is not restored and only data required at a current use time is received from a cloud.

6. The method of claim 1, further comprising determining, by the server, whether to convert the file format of backup data included in the backup data list, based on identification information of the second image forming apparatus received from the second image forming apparatus.

7. The method of claim 6, further comprising:
    receiving, by the server from the second image forming apparatus, a selection of backup data having a file format whose conversion is required;
    converting, by the server, the file format of the selected backup data; and
    transmitting, by the server to the second image forming apparatus, the backup data having the converted file format.

8. The method of claim 6, further comprising transmitting, by the server to the second image forming apparatus, a list of backup data whose conversion is impossible from among backup data having a file format whose conversion is required.

9. The method of claim 1, wherein the backup data list comprises a data type, a data name, a data path, an owner, a date, a version, or a usage count.

10. A non-transitory machine-readable recording medium having recorded thereon instructions executable by a processor, the non-transitory machine-readable recording medium comprising:
- instructions to receive, by a server, a data backup request from a first image forming apparatus;
- instructions to receive, by the server, a backup data list generated by using a first security key to encrypt data and identification information of the first image forming apparatus, the backup data list including a list of files of the first image forming apparatus;
- instructions to receive, by the server from the first image forming apparatus, backup data, the backup data including a first file and a second file from the list of files, wherein the first file is a separate file from the second file and the first file and the second file are each encrypted by using the first security key;
- instructions to receive, by the server from a second image forming apparatus, a second security key corresponding to a data restoration request;
- instructions to determine, by the server, whether a file format of the backup data needs to be converted for execution by the second image forming apparatus; and
- instructions to, when the second security key received from the second image forming apparatus is the same as the first security key, transmit, by the server, the backup data list including a list of files that need conversion based on the file format to the second image forming apparatus.

11. A cloud comprising:
a processor; and
a memory to store instructions executable by the processor, wherein the processor executes the instructions to:
- receive, by the cloud, a data backup request from a first image forming apparatus;
- receive, by the cloud, a backup data list generated by using a first security key to encrypt data and identification information of the first image forming apparatus, the backup data list including a list of files of the first image forming apparatus;
- receive, by the cloud from the first image forming apparatus, backup data, the backup data including a first file and a second from the list of files, wherein the first file is a separate file from the second file and the first file and the second file are each encrypted by using the first security key;
- receive, by the cloud from a second image forming apparatus, a second security key corresponding to a data restoration request;
- determine, by the cloud, whether a file format of the backup data needs to be converted for execution by the second image forming apparatus; and
- when the second security key received from the second image forming apparatus is the same as the first security key, transmit, by the cloud, the backup data list including a list of files that need conversion based on the file format to the second image forming apparatus.

12. The cloud of claim 11, wherein the first security key is generated by the first image forming apparatus by using a security identification value received from a user, a security identification value generated by the cloud, the identification information of the first image forming apparatus, or user identification information.

13. The cloud of claim 11, wherein the processor executes the instructions to receive, by the cloud, the backup data transmitted according to a priority order of system backup data, application backup data, and print backup data, determined according to a preset criterion by the first image forming apparatus.

14. The cloud of claim 11, wherein the processor executes the instructions to request, by the cloud, the second image forming apparatus to select a restoration mode for determining whether to restore a whole or a part of the backup data list, and transmit, by the cloud, backup data to the second image forming apparatus according to the restoration mode selected by the second image forming apparatus.

15. The cloud of claim 14, wherein the restoration mode comprises:
- a first restoration mode in which all backup data included in the backup data list is restored;
- a second restoration mode in which backup data used a predetermined number of times or more in the backup data list is restored;
- a third restoration mode in which backup data used within a predetermined period in the backup data list is restored; or
- a fourth restoration mode in which backup data included in the backup data list is not restored and only data required at a current use time is received from the cloud.

16. The cloud of claim 11, wherein the processor executes the instructions to:
- receive, by the cloud from the second image forming apparatus, a selection of backup data having a file format whose conversion is required;
- convert, by the cloud, the file format of the selected backup data; and
- transmit, by the cloud to the second image forming apparatus, the backup data having the converted file format.

17. The cloud of claim 11, wherein the backup data list comprises a data type, a data name, a data path, an owner, a date, a version, or a usage count.

* * * * *